United States Patent [19]

Iwanaga

[11] Patent Number: 4,580,466
[45] Date of Patent: Apr. 8, 1986

[54] TRANSMISSION CONTROL SYSTEM INCLUDING SELECT SHOCK SUPPRESSING ARRANGEMENT

[75] Inventor: Kazuyoshi Iwanaga, Atsugi, Japan

[73] Assignee: Nissan Motor Co., Ltd., Yokohama, Japan

[21] Appl. No.: 580,425

[22] Filed: Feb. 15, 1984

[30] Foreign Application Priority Data

Feb. 21, 1983 [JP] Japan .................... 58-26300

[51] Int. Cl.$^4$ ...................... B60K 41/16; B60K 41/06
[52] U.S. Cl. ........................ 74/868; 74/877; 74/869
[58] Field of Search .............. 74/869, 868, 867, 877, 74/870

[56] References Cited

U.S. PATENT DOCUMENTS

| | | | |
|---|---|---|---|
| 3,004,446 | 10/1961 | Flinn | 74/869 |
| 3,248,964 | 5/1966 | Ivey | 74/869 |
| 3,495,481 | 2/1970 | Ohie et al. | 74/869 X |
| 3,670,599 | 6/1972 | Nagamatsu | 74/869 |
| 3,683,721 | 8/1972 | Uozumi et al. | 74/869 |
| 3,871,250 | 3/1975 | Miyauchi et al. | 74/867 X |
| 3,890,856 | 6/1975 | Miyauchi et al. | 74/869 |
| 3,999,450 | 12/1976 | Miyauchi et al. | 74/864 |
| 4,086,994 | 5/1978 | Hirosawa et al. | 192/109 |
| 4,334,441 | 6/1982 | Iwanaga et al. | 74/868 |
| 4,420,994 | 12/1983 | Muller et al. | 74/867 |
| 4,438,664 | 3/1984 | Fiala | 74/877 X |
| 4,462,280 | 7/1984 | Sugano et al. | 74/867 X |
| 4,467,675 | 8/1984 | Sugano et al. | 74/869 |
| 4,501,174 | 2/1985 | Sugano | 74/869 |

FOREIGN PATENT DOCUMENTS

| | | |
|---|---|---|
| 482982 | 2/1974 | Australia . |
| 0047517 | 3/1982 | European Pat. Off. . |
| 0059425 | 9/1982 | European Pat. Off. . |
| 2947897 | 7/1981 | Fed. Rep. of Germany . |
| 2433119 | 3/1980 | France . |
| 0055749 | 5/1981 | Japan .................... 74/869 |
| 0193958 | 11/1983 | Japan .................... 74/868 |
| 2029525 | 3/1980 | United Kingdom . |
| 2039335 | 8/1980 | United Kingdom . |

OTHER PUBLICATIONS

European Search Report.

Primary Examiner—George H. Krizmanich
Assistant Examiner—Dirk Wright
Attorney, Agent, or Firm—Schwartz, Jeffery, Schwaab, Mack, Blumenthal & Evans

[57] ABSTRACT

In order to ensure that an adequately high gear ratio (such as top gear) is engaged momentarily before the first gear ratio and thus reduce select shock when a manual selector valve is moved from neutral (N) to drive (D), while simultaneously enabling the provision of a flow restriction required to ensure smooth automatic upshifting into the high gear in question, a control valve is provided which, in response to the engine associated with the transmission being sensed in an idling condition and the manual selector valve being moved from (N) to (D), boosts the governor pressure up to line pressure level and therefore induces the shift valves of the transmission to assume their respective upshift positions. Further, a valve which by-passes the flow restriction is provided. This "by-pass" valve assumes a position wherein it by-passes the flow restriction and unrestrictedly supplies the shift valve which controls the friction elements which produce the high gear ratio, with line pressure for a brief period prior the pressure fed to the friction units utilized to produce the second speed ratio biasing the by-pass valve to a position wherein the flow restriction is no longer by-passed and thus effective for shift shock suppression.

6 Claims, 2 Drawing Figures

TRANSMISSION CONTROL SYSTEM INCLUDING SELECT SHOCK SUPPRESSING ARRANGEMENT

BACKGROUND OF THE INVENTION

1. Field of the Invention

The present invention relates generally to an automatic automotive transmission and more specifically to a control system for same which enables both select shock and shift shock attenuation.

2. Description of the Prior Art

In an automatic automotive transmission there is a general tendancy for so called "select shock" to be produced when a manual selector valve is moved from neutral (N) to the forward automatic drive range (D) due to the sudden coupling of the engine to the transmission (via a torque converter or the like). A known method of reducing this phenomenon is to couple the friction elements which produce a high speed gearing (preferably the highest) just prior those which produces first speed so as to reduce the effect of engine torque on the transmission.

One method of acheiving the above mentioned select shock attenuating gear selection is to detect engine idling and feed line pressure to the shift valves in place of the normal governor pressure under such circumstances, to induce same to assume their respective upshift positions. However, in the case of a three speed transmission wherein two clutches (e.g., a foward clutch and a high and reverse clutch) are provided, wherein first gear is produced when the forward clutch is engaged and third speed by engaging both of the clutches and wherein a one-way clutch is utilized so that first speed can be produced by engaging only the forward clutch; in order to reduce select shock, it is necessary to ensure that the high and reverse clutch is engaged slightly before the forward clutch. To achieve this it is possible to provide a flow restriction in the passage through which hydraulic fluid is fed to the forward clutch and no restriction or orifice in the fluid circuit through which the high and reverse clutch is pressurized. On the other hand, in order to prevent shift shock during a 2-3 shift, the pressure in the high and reverse clutch must be raised slowly enough to allow time for the release of the brake engaged to produce second gear. Viz., to reduce select shock it is necessary to rapidly pressurize the high and reverse clutch while, on the contrary, during a 2-3 shift the pressurization must be suitably delayed to avoid shift shock. Accordingly, a simple control arrangement via which both of these conflicting requirements can be readily obtained has been wanting.

SUMMARY OF THE INVENTION

It is an object of the present invention to provide a control system for an automatic automotive transmission which is simple and which can attenuate both select as well as shift shock.

In brief, the above object is achieved via a transmission control system wherein, in order to ensure that an adequately high gear ratio (such as top gear) is engaged momentarily before the first gear ratio or speed and thus reduce select shock when a manual selector valve is moved from neutral (N) to drive (D), while simultaneously enabling the provision of a flow restriction required to ensure smooth automatic upshifting into the high gear in question, a control valve is provided which, in response to the engine associated with the transmission being sensed in an idling condition and the manual selector valve being moved from (N) to (D), boosts the govenor pressure up to line pressure level and therefore induces the shift valves of the transmission to assume their respective upshift positions. Further, a valve which by-passes the flow restriction is provided. This by-pass valve assumes a position wherein it by-passes the flow restriction and unrestrictedly supplies the shift valve which controls the friction elements which produce the high gear ratio, with line pressure for a brief period prior the pressure fed to the friction units utilized to produce the second speed ratio biasing the by-pass valve to a position wherein the flow restriction is no longer by-passed and thus effective for shift shock suppression.

More specifically, the present invention takes the form of a control system for an automatic automotive transmission having first and second hydraulically operated engagement devices and wherein when the first engagement device is released and the second engagement device is engaged, a first predetermined gear ratio is established and when both of the first and second engagement members are engaged a gear ratio higher than the predetermined one is established, and which features a first hydraulic circuit via which hydraulic fluid is supplied to the first engagement device, a manual selector valve fluidly interposed between the circuit and a source of hydraulic fluid under pressure, the manual selector valve being movable between a neutral position and a drive position wherein fluid communication between the source and the circuit is interrupted and established, respectively, a shift valve disposed in the circuit which is responsive to a control signal variable with a given operational parameter and which selectively permits hydraulic fluid to pass through the circuit from the manual selector valve to the first engagement device upon changing from a downshift condition to an upshift condition, a delay disposed in the hydraulic circuit for limiting the rate at which hydraulic fluid can be supplied to the first engagement device through the shift valve, a device for detecting an idling condition of an engine associated with said transmission, a control valve operatively connected with the idling detecting device, said control valve being connected to the shift valve for inducing the shift valve to assume the upshift condition wherein hydraulic fluid is supplied therethrough to the first engagement device when the idling device detects the idling condition and the manual selector valve is moved from the neutral position to the drive position, and a by-pass valve fluid connected with the manual selector valve and which assumes a condition wherein it by-passes the delay when the manual selector valve is moved into the neutral position.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
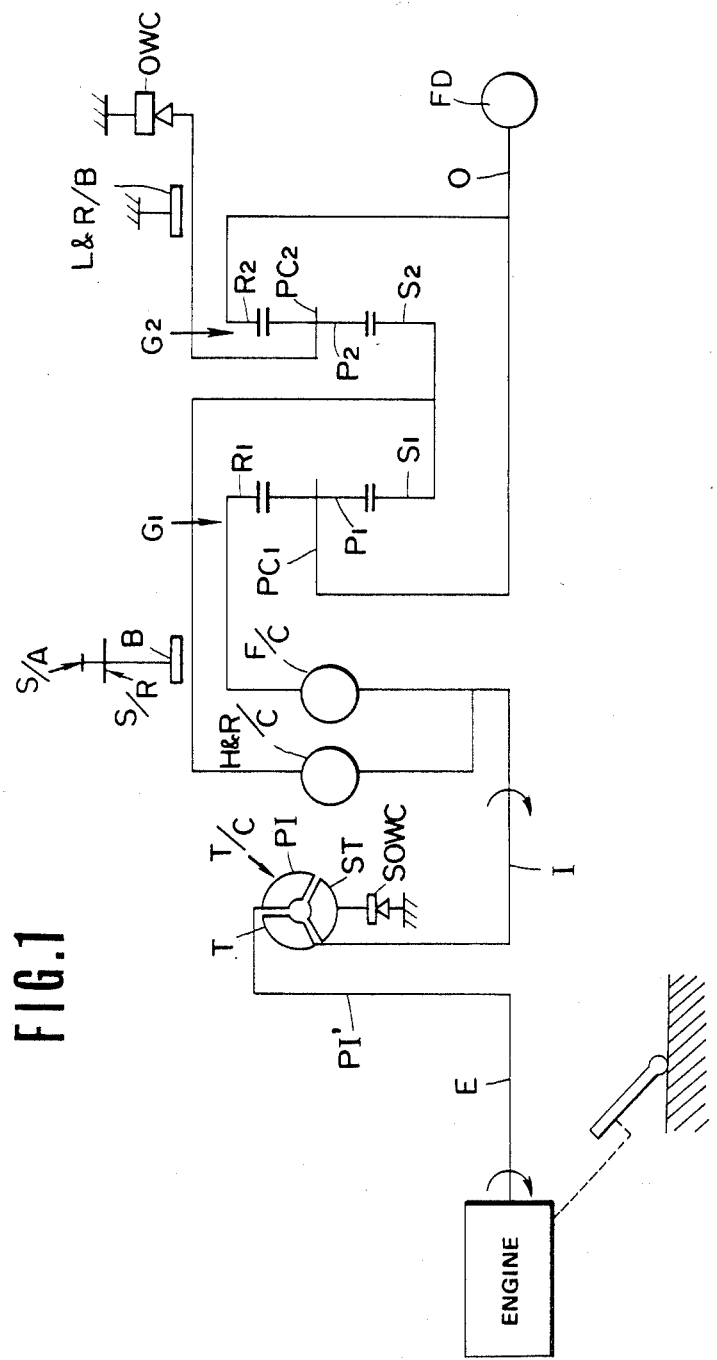
FIG. 1 is a schematic view of a three speed transmission in which the present invention finds application.

FIG. 1 shows, in schematic form, a three forward and one reverse speed transmission gear train to which an embodiment of the present invention is applied. This arrangement, as shown, includes an input shaft I which is operatively connected with an output shaft E of an engine via a torque converter T/C, an output shaft O which is operatively connected with a final drive unit FD, a first planeary gear set $G_1$, a second planetary gear set $G_2$, a high and reverse clutch H&R/C, a forward clutch F/C, an intermediate band brake B, a low and reverse brake L&R/B and a one-way clutch OWC.

The first planetary gear set $G_1$ includes a sun gear $S_1$, a ring gear $R_1$ and interconnecting pinion gears $P_1$ carried on a pinion carrier $PC_1$. The second set $G_2$ includes a sun gear $S_2$, a ring gear $R_2$ and interconnecting pinion gears $P_2$ carried on a carrier $PC_2$. As shown, the carrier $PC_1$ of the first planetary gear set $G_1$ is connected with the output shaft O while the sun gear $S_1$ and the ring gear $R_1$ thereof are selectively connectable with the input shaft I via the high and reverse clutch H&R/C and the forward clutch F/C, respectively. The ring gear $R_2$ of the second plan set $G_2$ is connected to the output shaft O while the pinion carrier $PC_2$ is connected with the transmission casing (no numeral) through the one-way clutch OWC and selectively connectable therewith via the low and reverse brake L&R/B. The sun gears $S_1$ and $S_2$ are interconnected and selectively connectable with the transmission casing through the intermediate band brake B.

In this arrangement the band brake B is controlled by a hydraulic servo mechanism including a servo apply chamber S/A and a servo-release chamber S/B. The effective area of the servo apply chamber S/A is less than that of the servo release chamber S/B so that introduction of hydraulic fluid into the apply chamber S/A applys the band brake B while the introduction of the same pressure in the release chamber S/R releases the brake irrespective of the presence of the same pressure in the apply chamber.

The torque converter T/C includes a pump impeller PI' a turbine runner T and a stator ST. The pump impeller PI is connected with the engine output shaft E through the torque converter cover PI' while the turbine runner T is connected to the input shaft I and the stator to the transmission casing through a one-way clutch SOWC.

Selective application of the high and reverse clutch H&R/C, forward clutch F/C, brand brake B and low and reverse brake L&R/B enables the production of three forward speeds (or gear ratios) and one reverse speed as shown in the table below. In this table the symbol O denotes engagement. It will be also noted that in the event that the low and reverse brake is not applied to produce first speed, an engine braking function is not provided.

|  | H & R/C | F/C | L & R/B (OWC) | B S/A | B S/R |
|---|---|---|---|---|---|
| 1st speed |  | o | o |  |  |
| 2nd speed |  | o |  | o |  |
| 3rd speed | o | o |  | o | o |
| Reverse | o |  | o |  |  |

Figure 2:
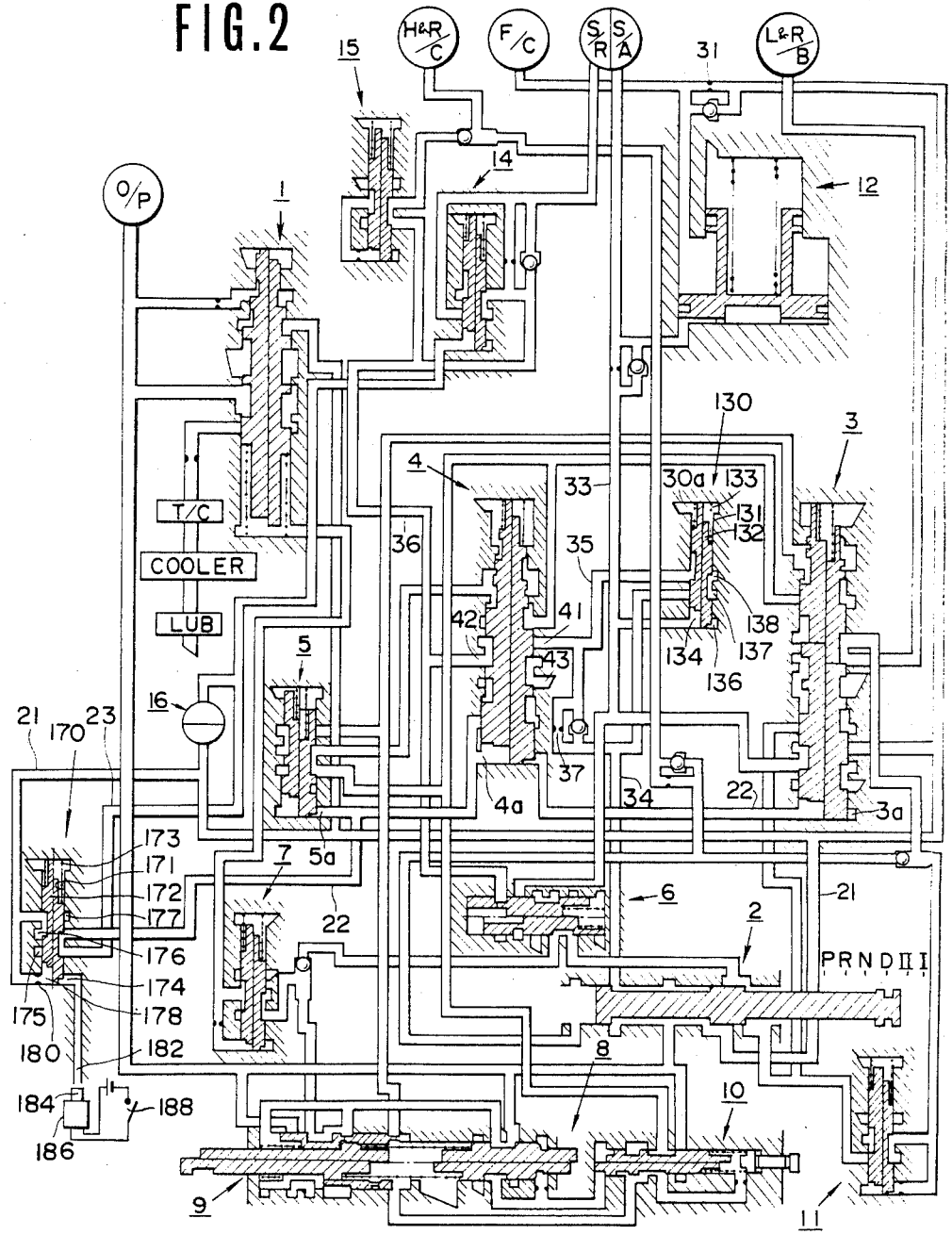
FIG. 2 shows a hydraulic control circuit for the FIG. 1 transmission which incorporates the present invention.

FIG. 2 shows a hydraulic control arrangement via which the above described brakes and clutches are selectively applied and released. This arrangement includes an oil pump O/P, a regulator valve 1, a manual selector valve 2, a 1-2 shift valve 3, a 2-3 shift valve 4, a 3-2 downshift valve 5, a line pressure booster valve 6, a pressure modifying valve 7, a throttle valve 8, a throttle failsafe valve 9, a throttle modulator valve 10, a first gear range pressure reducing valve 11, an accumulator 12, a 3-2 timing valve 13, a high and reverse pressure reduction valve 15, a governor valve 16, an orifice change valve 130 and a solenoid valve 170.

The construction and operation of this arrangement with the exception of the orifice change valve 130 and the solenoid valve 170 is essentially the same as that disclosed in European Patent Application patent publication No. 0 059 425 on Sept. 8, 1982, the disclosure of which is incorporated herein by reference.

In this embodiment, the orifice change valve 130 comprises a bore 131 in which a spool 132 is reciprocatively received. The spool 132 is biased in one direction by a spring 133. A variable volume chamber 134 defined in the bore by the spool fluidly communicates via port 136 with the conduit 33 which delivers hydraulic fluid under pressure (viz., line pressure) to the sevo-release chamber S/A of the band brake B. The bore is further formed with ports 137 and 138.

Port 137 is arranged to fluidly communicate with passage or conduit 34 which is supplied with line pressure upon the manual selector lever being set in any one of D, N or R positions. Port 138 is connected with conduit 35 which leads from the orifice change valve 130 to port 41 of the 2-3 shift valve 4. As shown, passage 35 merges with conduit 34 at a location downstream of a delay arrangement which includes an orifice 37.

The present embodiment further features a solenoid valve 170. This valve 170 comprises a bore 171 in which a spool 172 is reciprocatively disposed and biased in one direction by a spring 173. The bore 171 is formed with ports 174, 175, 176 and 177. Ports 174 and 177 both communicate with a conduit 21 which is supplied with line pressure when the manual selector valve 2 is moved into any of the D, II or I positions. Port 174 fluidly communicates with a chamber 178 defined in bore 171 by the spool 171, via a flow restriction 180. This chamber 178 is also provided with a drain port 182 which is selectively closed by a valve member 184. In this embodiment the valve member 184 takes the form of a plunger movable under the influence of a solenoid 186. The solenoid 186 is arranged to be energized to move the valve member 184 into a position which closes the drain port 182 upon closure of a switch 188. This switch 188 is arranged to be closed by an accelerator pedal (see FIG. 1) assuming a fully released position.

Port 175 is supplied governor pressure via conduit 23 from the governor valve 16 while port 176 is arranged to fluidly communicate via conduit 22 with the 1-2 and 2-3 shift valves 3 and 4, as shown.

With this arrangement, while the accelerator pedal is depressed the solenoid 186 remains deenergized and the pressure in chamber 178 remains essentially zero due to the provision of the flow restriction or orifice 180 and the non-closure of the drain port 182. Accordingly, the spool 172 remains in the position illustrated by the right hand half section thereof. In this position, communication between ports 175 and 176 is established whereby governor pressure is transmitted via conduits 22 and 23 to the 1-2 and 2-3 shift valves 3 and 4 in a normal manner. Prior to a 1-2 upshift the spool of the 1-2 shift valve remains in the position illustrated by the right hand half section thereof whereby the conduit 33 is depressurized and the spool 132 of the orifice change valve 130 assumes the position illustrated by the right hand half section thereof.

Upon a 1-2 upshift, the spool of the 1-2 shift valve rises to the position illustrated by the left hand half thereof permitting line pressure from conduit 21 to be transmitted therethrough to conduit 33 and thus the servo-apply chamber S/A and chamber 136. Under these conditions the spool 131 of the orifice change valve rises against the bias of the spring to assume the position illustrated by the left hand half section thereof. In this position the spool closes port 137 and thus cuts off communication between conduits 34 and 35. This of course renders orifice 37 effective whereby upon a 2-3 upshift line pressure is supplied via the orifice and ports 41 and 42 of the 2-3 shift valve 4 to the high and reverse clutch H&R/C in a manner which allows time for the brand brake B to be released via the pressurization of the servo-release chamber S/R, attenuating shift shock.

Upon a 3-2 downshift port 42 of the 2-3 shift valve is placed in communication with port 43 which is a drain in this embodiment. Accordingly, the H&R/C is unrestrictedly drained to acheive a rapid release thereof.

When the manual selector valve 2 is placed in the N position and the accelerator pedal released (such as comming to a halt at a traffic signal or the like) the solenoid 186 is energized and the drain port 182 closed by the valve member 184. However, as line pressure is not being fed into conduit 21, under these conditions, the spool remains in the position illustrated by the right hand half section thereof. However, upon the manual select lever being moved from N to D, line pressure is fed into conduit 21 and thus into chamber 178 via the orifice of flow restriction 180. This drives the spool upwardly (as seen in the drawings) against the bias of the spring 173 placing ports 176 and 177 in fluid communication. Line pressure is thus fed into conduit 22 forcing the 1-2 and 2-3 shift valves into their respective upshift positions (viz., positions illustrated by the left hand half sections thereof). At this time, as line pressure is prevailing in conduits 34 and 35 line pressure is fed unrestrictedly to the high and reverse clutch H&R/C rapidly pressurizing same. Very shortly, thereafter, the line pressure prevailing in conduit 33 causes the spool 132 to move upwardly against the bias of the spring 133 thus terminating the communication between ports 137 and 138. However, it will be appreciated that as the vehicle is not moving, the amount of torque being delivered to the transmission is rather small and that the initial unrestricted pressurization (followed by the normal restricted communication subsequent to the upward movement of the spool 132) of the high and reverse clutch H&R/C is sufficient to ensure that the third speed is adequately engaged before the first speed and thus attenuate shift shock.

Upon depression of the accelerator pedal the solenoid is de-energized, the spool 172 returns to the position illustrated by the right hand section thereof, conduit 22 is again placed in communication with the governor valve 16 and the 1-2 and 2-3 shift valves return to their respective downshift positions. Upon the 2-3 shift valve 4 assuming a downshift position port 42 is placed in fluid communication with port 43 (drain) and the transmission accordingly conditioned for operation in first speed.

What is claimed is:

1. In a control system for an automatic automotive transmission having first and second hydraulically operated engagement devices and wherein when said first engagement device is released and said second engagement device is engaged, a first predetermined gear ratio is established and when both of said first and second engagement members are engaged a higher gear ratio is established,
   a first hydraulic circuit via which hydraulic fluid is supplied to said first engagement device;
   a manual selector valve fluidly interposed between said circuit and a source of hydraulic fluid under pressure, said manual selector valve being movable between a neutral position and a drive position wherein fluid communication between said source and said circuit is interrupted and established, respectively;
   a shift valve disposed in said first hydraulic circuit which is responsive to a control signal variable with a given operational parameter and which selectively permits hydraulic fluid to pass through said first hydraulic circuit from said manual selector valve to said first engagement device upon changing from a downshift condition to an upshift condition;
   a flow restriction disposed in said first hydraulic circuit for limiting the rate at which hydraulic fluid can be supplied to said first engagement device through said shift valve;
   a device for detecting an idling condition of an engine associated with said transmission;
   a control valve operatively connected with said idling detecting device, said control valve being connected to said shift valve for inducing said shift valve to assume said upshift condition wherein hydraulic fluid is supplied therethrough to said first engagement device when said idling device detects said idling condition and said manual selector valve is moved from said neutral position to said drive position; and
   a by-pass valve connected with said manual selector valve and which assumes a condition wherein it by-passes said flow restriction when said manual selector valve is moved into said neutral position.

2. In a control system for an automatic automotive transmission having first and second hydraulically operated engagement devices and wherein when said first engagement device is released and said second engagement device is engaged, a first predetermined gear ratio is established and when both of said first and second engagement members are engaged a higher gear ratio is established,
   a first hydraulic circuit via which hydraulic fluid is supplied to said first engagement device;
   a manual selector valve fluidly interposed between said circuit and a source of hydraulic fluid under pressure, said manual selector valve being movable between a neutral position and a drive position wherein fluid communication between said source and said circuit is interrupted and established, respectively;

a shift valve disposed in said first hydraulic circuit which is responsive to a control signal variable with a given operational parameter and which selectively permits hydraulic fluid to pass through said first hydraulic circuit from said manual selector valve to said first engagement device upon changing from a downshift condition to an upshift condition;

a flow restriction disposed in said first hydraulic circuit for limiting the rate at which hydraulic fluid can be supplied to said first engagement device through said shift valve;

a device for detecting an idling condition of an engine associated with said transmission;

a control valve operatively connected with said idling detecting device, said control valve being connected to said shift valve for inducing said shift valve to assume said upshift condition wherein hydraulic fluid is supplied therethrough to said first engagement device when said idling device detects said idling condition and said manual selector valve is moved from said neutral position to said drive position;

a by-pass valve connected with said manual selector valve and which assumes a condition wherein it by-passes said flow restriction when said manual selector valve is moved into said neutral position;

a second hydraulic circuit fluidly interconnecting said manual selector valve with a third engagement device which when engaged while said first engagement device is released and said second engagement device is engaged, produces a gear ratio intermediate of said predetermined gear ratio and said higher gear ratio, said second circuit being fluidly connected with said by-pass valve so that when hydraulic fluid is fed to said third engagement device, said by-pass valve assumes said condition wherein said flow restriction is not by-passed and rendered effective.

3. A control system as claimed in claim 2, wherein said by-pass valve includes a spool reciprocatively received in a bore and biased in one direction toward a first direction by a spring, said spool defining a first chamber in said bore which fluidly communicates with said second circuit, said first chamber being arranged so that when hydraulic fluid is supplied thereinto said spool is biased in a second direction opposite said first direction toward a second position against the bias of said spring, said spool being arranged to open a by-pass passage which by-passes said flow restriction when in said first position and close same in said second position.

4. A control system as claimed in claim 2, wherein said control valve includes a spool reciprocatively disposed in a bore and which is biased in a first direction toward a first position by a spring, a first chamber defined in said bore which communicates with said second engagement device through a flow restrictor, said chamber including a drain port controlled by a mechanism responsive to said idling detecting device, said mechanism closing said drain port when said idling detecting device detects said idling condition, said chamber being arranged so that hydraulic pressure therein produces a bias which biases said spool in a second direction opposite said first direction and against the bias of said spring and toward a first position, said spool being arranged to connect said source with said shift valve when in said second position in a manner that, when said manual selector valve is in said drive position, said shift valve is induced to assume said upshift position.

5. A control system as claimed in claim 2, wherein said shift valve includes a drain port and is arranged to establish a fluid connection between said first engagement device and said drain port when in said downshift condition.

6. A control system as claimed in claim 4, wherein said idling detecting device takes the form of a switch which is operated when a manually operable member associated with said engine is moved to an idling inducing position and wherein said mechanism takes the form of a solenoid operated valve responsive to the closure of said switch.

* * * * *